US012718690B2

(12) United States Patent
Gabb et al.

(10) Patent No.: US 12,718,690 B2
(45) Date of Patent: Aug. 25, 2026

(54) METHOD FOR THE INFRASTRUCTURE-SUPPORTED ASSISTANCE OF MULTIPLE MOTOR VEHICLES

(71) Applicant: Robert Bosch GmbH, Stuttgart (DE)

(72) Inventors: Michael Gabb, Gaeufelden (DE); Stefan Nordbruch, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 139 days.

(21) Appl. No.: 18/250,934

(22) PCT Filed: Jan. 18, 2022

(86) PCT No.: PCT/EP2022/050980
§ 371 (c)(1),
(2) Date: Apr. 27, 2023

(87) PCT Pub. No.: WO2022/167213
PCT Pub. Date: Aug. 11, 2022

(65) Prior Publication Data

US 2024/0331537 A1 Oct. 3, 2024

(30) Foreign Application Priority Data

Feb. 8, 2021 (DE) ..................... 10 2021 201 130.6

(51) Int. Cl.

| | |
|---|---|
| ***G08G 1/0967*** | (2006.01) |
| ***G07C 5/00*** | (2006.01) |
| ***G07C 5/08*** | (2006.01) |
| ***G08G 1/0968*** | (2006.01) |
| ***G08G 1/16*** | (2006.01) |

(52) U.S. Cl.
CPC ....... *G08G 1/096775* (2013.01); *G07C 5/008* (2013.01); *G07C 5/0816* (2013.01);
(Continued)

(58) Field of Classification Search
CPC ....... G08G 1/096775; G08G 1/096708; G08G 1/096741; G08G 1/096791;
(Continued)

(56) References Cited

U.S. PATENT DOCUMENTS

2007/0005609 A1 1/2007 Breed
2018/0122237 A1 5/2018 Nascimento et al.
(Continued)

FOREIGN PATENT DOCUMENTS

CN 102307755 A 1/2012
CN 102834852 A 12/2012
(Continued)

OTHER PUBLICATIONS

International Search Report for PCT/EP2022/050980, Issued Jun. 10, 2022.

*Primary Examiner* — Tyler D Paige
(74) *Attorney, Agent, or Firm* — NORTON ROSE FULBRIGHT US LLP

(57) ABSTRACT

A method for the infrastructure-supported assistance of multiple motor vehicles. The method includes: receiving of driving-environment signals which represent a driving environment of the motor vehicles; ascertaining, based on the driving-environment signals, of infrastructure-assistance data for the infrastructure-supported assistance of the motor vehicles; transmitting of infrastructure-assistance data signals, which represent the ascertained infrastructure-assistance data, to the motor vehicles; prioritizing the motor vehicles in order to assign a priority to each of the motor vehicles; at least one of the steps of ascertaining the infrastructure-assistance data and of transmitting the infrastructure-assistance data signals being carried out based on the priorities assigned to the motor vehicles.

11 Claims, 2 Drawing Sheets

(52) U.S. Cl.
CPC . *G08G 1/096708* (2013.01); *G08G 1/096741* (2013.01); *G08G 1/096791* (2013.01); *G08G 1/096816* (2013.01)

(58) Field of Classification Search
CPC ....... G08G 1/096816; G08G 1/096716; G08G 1/096725; G08G 1/096811; G08G 1/164; G08G 1/096783; G07C 5/008; G07C 5/0816
USPC ............................................................ 701/23
See application file for complete search history.

(56) References Cited

U.S. PATENT DOCUMENTS

| | | | | |
|---|---|---|---|---|
| 2019/0012912 | A1* | 1/2019 | Kim | B60K 35/10 |
| 2020/0026289 | A1* | 1/2020 | Alvarez | G06F 16/27 |
| 2020/0035098 | A1* | 1/2020 | Vozar | B60W 50/0205 |
| 2020/0133288 | A1* | 4/2020 | Abari | G05D 1/0088 |
| 2020/0158864 | A1* | 5/2020 | Achour | H04W 4/40 |
| 2020/0276931 | A1 | 9/2020 | Wang | |
| 2020/0334978 | A1* | 10/2020 | Pittman | G08G 1/0112 |
| 2021/0016777 | A1* | 1/2021 | Weiser | G08G 1/096 |
| 2024/0331537 | A1* | 10/2024 | Gabb | G08G 1/096816 |

FOREIGN PATENT DOCUMENTS

| | | | |
|---|---|---|---|
| CN | 109709962 | A | 5/2019 |
| DE | 102006057741 | A1 | 9/2007 |
| DE | 102016209993 | A1 | 12/2017 |
| DE | 102017220420 | B3 | 4/2019 |
| DE | 102017219302 | A1 | 5/2019 |
| DE | 102019127816 | A1 | 4/2020 |
| JP | 2020037400 | A | 3/2020 |
| JP | 2020045090 | A | 3/2020 |

* cited by examiner

METHOD FOR THE INFRASTRUCTURE-SUPPORTED ASSISTANCE OF MULTIPLE MOTOR VEHICLES

FIELD

The present invention relates to a method for the infrastructure-supported assistance of multiple motor vehicles, an apparatus, a computer program and a machine-readable storage medium.

BACKGROUND INFORMATION

Japan Patent Application No. JP 2020 037 400 A describes a support of vehicles by way of an RSU (Road-Side Unit).

German Patent No. DE 10 2017 220 420 B3 describes a method for generating a gathering of traffic information.

Japan Patent Application No. JP 2020 045090 A describes a method for the support of an automatic control of a vehicle.

U.S. Patent Application Publication No. US 2020/0276931 A1 describes a method for vehicle interaction for an autonomous vehicle.

SUMMARY

An object of the present invention is to provide for the efficient infrastructure-supported assistance of multiple motor vehicles.

This objective may be achieved with the aid of the present invention. Advantageous refinements of the present invention are disclosed herein.

According to a first aspect, a method is provided for the infrastructure-supported assistance of multiple motor vehicles, including the following steps:

- Receiving of driving-environment signals which represent an (individual) driving environment of the motor vehicles,
- Ascertaining, based on the driving-environment signals, of infrastructure-assistance data for the infrastructure-supported assistance of the motor vehicles,
- Transmitting of infrastructure-assistance data signals, which represent the ascertained infrastructure-assistance data, to the motor vehicles,
- Prioritizing the motor vehicles in order to assign a priority to each of the motor vehicles,
- at least one of the steps of ascertaining the infrastructure-assistance data and of transmitting the infrastructure-assistance data signals being carried out based on the priorities assigned to the motor vehicles.

According to a second aspect, an apparatus is provided, particularly an RSU, which is equipped to carry out all steps of the method according to the first aspect.

According to a third aspect, a computer program is provided which includes commands that, upon execution of the computer program by a computer, e.g., by the apparatus according to the second aspect, prompt it to carry out a method according to the first aspect.

According to a fourth aspect, a machine-readable storage medium is provided, on which the computer program according to the third aspect is stored.

The present invention is based on and includes the finding that the objective above may be achieved by prioritizing the motor vehicles which receive infrastructure assistance by way of the infrastructure-assistance data, each of the motor vehicles being assigned a priority corresponding to the prioritization. The step of ascertaining the infrastructure-assistance data and/or the step of transmitting the infrastructure-assistance data signals to the motor vehicles is/are carried out based on the priorities. These steps may therefore be carried out efficiently. For example, the motor vehicles need different infrastructure-assistance data depending on the priority. One motor vehicle is given a setpoint trajectory which the motor vehicle is able to follow in at least semi-automated fashion, while another motor vehicle, for example, needs direct support in the form of a remote control. Thus, the infrastructure assistance may be implemented in more carefully targeted fashion.

In addition, existing hardware- and/or software- and/or communication resources may be used efficiently on the basis of the prioritization. For example, should an available bandwidth only be sufficient to transmit the infrastructure-data signals to just some of the multiple motor vehicles, then, for instance, those motor vehicles having the highest priority are therefore selected. This holds true analogously in the case of a computing capacity available for ascertaining the infrastructure-assistance data.

This therefore yields the technical advantage that the motor vehicles may be supported efficiently by way of the infrastructure, that is, the motor vehicles may be assisted efficiently with the support of infrastructure.

An infrastructure-supported assistance of a motor vehicle within the meaning of the description means in particular that infrastructure-assistance data are made available to the motor vehicle. For instance, the motor vehicle may deduce handling instructions based on the infrastructure-assistance data. The motor vehicle may itself decide what should be done based on the infrastructure-assistance data, for example.

The formulation "in one specific embodiment of the apparatus according to the first aspect" used in this description covers the formulation "in one specific embodiment of the apparatus according to the first aspect, the specific embodiment including the respective features of at least one of the specific embodiments described in the specification." That is to say, the respective features of the specific embodiments described in the specification may thus also be in any combination.

The abbreviation "RSU" stands for "Road-Side Unit". The term road-side unit may be translated into German by "straßenseitige Einheit" or by "straßenseitige Infrastruktureinheit". Instead of the term "RSU", the following terms may also be used synonymously: road-side unit, road-side infrastructure unit, communication module, road-side communication module, road-side radio unit, road-side transmitting station.

According to one specific embodiment of the present invention, status signals are received which represent an individual status of the motor vehicles, the motor vehicles being prioritized based on the individual status.

For example, this provides the technical advantage that the motor vehicles are able to be prioritized efficiently.

According to one specific embodiment of the present invention, the status indicates one or more of the following status data: Automation level according to which the motor vehicle is driving at the moment, (probable) accident severity in the event of an absence of infrastructure-supported assistance, fault in a system of the motor vehicle, severity of a fault in a system of the motor vehicle, in the case of a motor vehicle guided at least in semi-automated fashion, a time indication as to when a driver of the motor vehicle will assume complete responsibility for the guidance of the motor vehicle.

For example, this yields the technical advantage that particularly suitable status data may be used.

The (probable) accident severity in response to the absence of infrastructure-supported assistance is or has been ascertained in the motor vehicle.

In one specific embodiment of the present invention, based on the status, a specific infrastructure-assistance time is ascertained for the motor vehicles, which indicates how long the specific motor vehicle will still be assisted, supported by the infrastructure. For example, it may be provided that the higher the automation level according to which the motor vehicle is driving at the moment, the longer the infrastructure-assistance time. This means, for example, that a first infrastructure-assistance time is ascertained for a first motor vehicle of the multiple motor vehicles which is driving according to a first automation level, a second infrastructure-assistance time being ascertained for a second motor vehicle of the multiple motor vehicles which is driving according to a second automation level, the second infrastructure-assistance time being greater than the first infrastructure-assistance time if the second automation level is higher than the first automation level. Reference is made to the explanations hereinafter with respect to the definitions of the various automation levels 0 through 4.

For instance, the infrastructure-assistance time amounts to between 8 s and 10 s in the case of a motor vehicle which is driving according to automation level 3 or lower.

In one specific embodiment of the present invention, a motor vehicle which is driving according to an automation level higher than 3 is supported until the motor vehicle has assumed a safe state, e.g., a halt or an emergency stop.

In one specific embodiment of the present invention, a motor vehicle is supported until a message transmitted by the motor vehicle is received which indicates that the motor vehicle no longer needs infrastructure assistance. For example, this is the case when the motor vehicle itself is able to deal with the current (individual) traffic situation, or when the driver of the motor vehicle has completely taken over the guidance.

According to one specific embodiment of the present invention, an individual criticality is determined for each of the motor vehicles, the individual criticality indicating an individual probability for the respective motor vehicle that the respective motor vehicle will have an accident, the motor vehicles being prioritized based on the individual criticalities determined.

For example, this provides the technical advantage that the motor vehicles are able to be prioritized efficiently. Therefore, according to this specific embodiment, an individual criticality is determined for each motor vehicle. In other words, for each motor vehicle, it is thus ascertained individually how critical an instantaneous individual traffic situation is for the motor vehicle. The more critical the instantaneous individual traffic situation is for a respective motor vehicle, the higher this motor vehicle is prioritized. Thus, it is possible to take efficiently into account the circumstance according to which a motor vehicle that finds itself in a critical individual traffic situation needs more infrastructure assistance than a motor vehicle which finds itself in a less critical individual traffic situation.

According to one specific embodiment of the present invention, the motor vehicles are classified into accident-probability classes based on the individual accident probability, the motor vehicles being prioritized based on their classified accident-probability class.

For example, this provides the technical advantage that the motor vehicles are able to be prioritized efficiently.

According to one specific embodiment of the present invention, an individual accident severity is determined for each of the motor vehicles, the motor vehicles being classified into accident-severity classes based on the individual accident severity, the motor vehicles being prioritized based on their classified accident-severity class.

For example, this provides the technical advantage that the motor vehicles are able to be prioritized efficiently.

According to one specific embodiment of the present invention, the individual method steps are carried out on the assumption that no infrastructure assistance is available for the motor vehicles by way of the infrastructure-assistance data.

For example, this yields the technical advantage that it is possible to determine efficiently what would happen and/or how critical an (individual) traffic situation may become for a motor vehicle if no infrastructure assistance is available for the motor vehicles by way of the infrastructure-assistance data. For instance, if a motor vehicle would not get into a critical situation even without infrastructure assistance, such a motor vehicle does not necessarily need infrastructure assistance. On the other hand, a motor vehicle which, without infrastructure assistance, will have a high probability of an accident, needs more infrastructure assistance.

In one specific embodiment of the present invention, the motor vehicles are informed about their priority.

For instance, this results in the technical advantage that the motor vehicles are efficiently put in the position to react to their priority. So, for instance, a motor vehicle which has a lower priority than another in comparison to it may prompt its driver to assume responsibility for the guidance of the motor vehicle.

According to one specific embodiment of the present invention, the informing involves the transmitting of one or more communication messages, each including the corresponding priority, to the motor vehicles. For instance, it is provided to transmit a broadcast message to the motor vehicles, the broadcast message including the corresponding priority for each of the motor vehicles. For example, a separate message is ascertained for each motor vehicle and transmitted to it, the communication message including the respective priority.

In one specific embodiment of the present invention, upon detection of a fault which makes it necessary to terminate the implementation of the method, based on the priorities, a subset of the motor vehicles is determined which should still receive infrastructure assistance by way of the infrastructure data, at least one of the steps of ascertaining the infrastructure-assistance data and of transmitting the infrastructure-assistance data signals being carried out only for the subset of motor vehicles determined.

For instance, this yields the technical advantage that at least for the determined subset of motor vehicles, the corresponding motor vehicles may still be supported efficiently by the infrastructure. That is, the motor vehicles which most urgently need to be supported by the infrastructure therefore also receive such support, even in the case of a fault.

For example, the case of fault includes a faulty function and/or a functional limitation in or failure of at least one component, such as a communication device and/or a processor device and/or an energy unit of the apparatus.

According to one specific embodiment of the present invention, the infrastructure-assistance data include remote-control commands for the remote control of a lateral guidance and/or longitudinal guidance of at least one of the multiple motor vehicles.

For example, this may provide the technical advantage that the motor vehicle may be efficiently controlled remotely. Thus, according to this specific embodiment, there is direct intervention in an operation of the motor vehicle, that is, in a guidance of the motor vehicle from outside, thus, remotely, via the remote control. So, for example, a possible collision of the motor vehicle with a potential collision object, e.g., another motor vehicle, in the area surrounding the motor vehicle may be avoided in efficient manner, or an accident severity may be reduced. In addition, this advantageously permits the motor vehicle to be remotely controlled through a critical situation in efficient manner, the motor vehicle not being capable in such a critical situation of dealing with it itself. For instance, such critical situations may include drives through the following infrastructure stretches: Tunnel, turnpike entrance, turnpike exit, turnpike intersection, bridge, intersection, particularly intersection in an urban area, rotary intersection, parking facility.

In general, it holds true, for example, that the support by the infrastructure is carried out in the situations mentioned above. That is, the method according to the first aspect is carried out particularly in such a situation, for example.

In one specific embodiment of the present invention, based on the driving-environment signals, a prediction is made of a traffic situation involving the motor vehicles in order to determine a future traffic situation, the infrastructure-assistance data being ascertained based on the future traffic situation.

For example, this may provide the technical advantage of permitting efficient ascertainment of the infrastructure-assistance data. According to this specific embodiment, the future traffic situation is thus additionally taken into account for ascertaining the infrastructure-assistance data. The future traffic situation is predicted, thus forecast, based on the driving-environment signals.

In one specific embodiment of the present invention, the motor vehicles are prioritized based on the future traffic situation.

In one specific embodiment of the present invention, the motor vehicles are prioritized based on the infrastructure-assistance data.

In one specific embodiment of the present invention, the driving environment is analyzed in order to ascertain a traffic circumstance (instantaneous traffic situation) in which the motor vehicles find themselves.

In one specific embodiment of the present invention, the motor vehicles are prioritized based on the ascertained traffic situation.

According to one specific embodiment of the present invention, the infrastructure-assistance data include traffic-situation data which represent the ascertained future traffic situation.

For example, this yields the technical advantage that the ascertained future traffic situation may be made available efficiently to the motor vehicles. Therefore, according to this specific embodiment, the result of the prediction, thus, the future traffic situation, is made available to the motor vehicles so that they themselves may efficiently plan and implement actions based on the future traffic situation.

According to the feature of the prioritization of the motor vehicles described here, it is provided, for example, that in the specific embodiments above, the remote-control commands are determined only for some of the multiple motor vehicles and transmitted according to the priorities. For example, this holds true analogously for the future traffic situation.

In one specific embodiment of the method according to the first aspect, the method is a computer-implemented method.

Technical functionalities of the method according to the first aspect are yielded from corresponding technical functionalities of the apparatus according to the second aspect and vice versa.

In other words, method features are thus derived from apparatus features and vice versa.

In one specific embodiment of the method of the present invention, it is carried out with the aid of the apparatus according to the second aspect.

The abbreviation "resp." stands for "and . . . respectively". The term "and . . . respectively" includes the term "respectively." The term "respectively" includes the formulation "and/or."

In one specific embodiment of the present invention, at least one of the motor vehicles is a motor vehicle guided in at least semi-automated fashion.

The formulation "at least semi-automated guidance" includes one or more of the following cases: Assisted guidance, semi-automated guidance, highly automated guidance, fully automated guidance.

Assisted guidance (automation level 1) means that a driver of the motor vehicle permanently carries out either the lateral guidance or the longitudinal guidance of the motor vehicle. The other driving task in each case (thus, a control of the longitudinal guidance or the lateral guidance of the motor vehicle) is carried out automatically. In other words, in the case of assisted guidance of the motor vehicle, either the lateral guidance or the longitudinal guidance is thus controlled automatically.

Semi-automated guidance (automation level 2) means that in a specific situation (for example: Driving on a turnpike, driving within a parking facility, passing an object, driving within a traffic lane which is defined by traffic-lane markings) and/or for a certain period of time, a longitudinal guidance and a lateral guidance of the motor vehicle are controlled automatically. A driver of the motor vehicle does not himself have to control the longitudinal and lateral guidance of the motor vehicle manually. However, the driver must constantly monitor the automatic control of the longitudinal and lateral guidance, in order to be able to intervene manually, if necessary. The driver must be ready at any time to completely take over the guidance of the motor vehicle.

Highly automated guidance (automation level 3) means that for a certain period of time in a specific situation (for example: Driving on a turnpike, driving within a parking facility, passing an object, driving within a traffic lane which is defined by traffic-lane markings) a longitudinal guidance and a lateral guidance of the motor vehicle are controlled automatically. A driver of the motor vehicle does not himself have to control the longitudinal and lateral guidance of the motor vehicle manually. The driver does not have to constantly monitor the automatic control of the longitudinal and lateral guidance in order to be able to intervene manually, if necessary. If required, a takeover prompt is output automatically—particularly with a sufficient time reserve—to the driver to take over the control of the longitudinal guidance and lateral guidance. The driver must therefore potentially be in the position to take over the control of the longitudinal guidance and lateral guidance. Limits of the automatic control of the lateral and longitudinal guidance are detected automatically. In the case of highly automated guidance, it is not possible to automatically bring about a minimal-risk state in every initial situation.

Fully automated guidance (automation level 4) means that in a specific situation (for example: Driving on a turnpike, driving within a parking facility, passing an object, driving within a traffic lane which is defined by traffic-lane markings), a longitudinal guidance and a lateral guidance of the motor vehicle are controlled automatically. A driver of the motor vehicle does not himself have to manually control the longitudinal and lateral guidance of the motor vehicle. The driver does not have to monitor the automatic control of the longitudinal and lateral guidance in order to be able to intervene manually, if necessary. Prior to a termination of the automatic control of the lateral and longitudinal guidance, a prompt is output automatically to the driver, particularly with a sufficient time reserve, to take over the driving task (control of the lateral and longitudinal guidance of the motor vehicle). If the driver does not take over the driving task, there is a return automatically to a minimal-risk state. Limits of the automatic control of the lateral and longitudinal guidance are detected automatically. In all situations, it is possible to return automatically to a minimal-risk system state.

In one specific embodiment of the method of the present invention, it is provided that at least one of the motor vehicles is guided manually by a driver (automation level 0).

The terms "assist" and "support" may be used synonymously.

In one specific embodiment of the present invention, the driving-environment signals include driving-environment sensor signals of one or more driving-environment sensors.

For example, a driving-environment sensor within the meaning of the description is one of the following driving-environment sensors: Radar sensor, lidar sensor, ultrasonic sensor, video sensor, magnetic-field sensor and infrared sensor. For instance, the driving-environment sensor is a driving-environment sensor of the motor vehicle, thus, a motor vehicle's own driving-environment sensor. For example, the driving-environment sensor is a driving-environment sensor of the infrastructure, thus, an infrastructure driving-environment sensor. In the case of a plurality of driving-environment sensors, at least one driving-environment sensor is a motor-vehicle's own driving-environment sensor, for example, and/or, e.g., at least one driving-environment sensor is an infrastructure driving-environment sensor.

Infrastructure driving-environment sensors are distributed spatially, for example.

In one specific embodiment of the present invention, data signals are received which represent data influencing traffic, the infrastructure-assistance data being determined based on the data signals. For example, such data include weather data and/or data from a database, e.g., cloud database. Such data include historical traffic data, for instance.

The predicting is carried out based on infrastructure data, for example, and is implemented, e.g., based on motor-vehicle data.

For instance, motor-vehicle data include or describe a present and/or a future trajectory of at least one of the motor vehicles and/or an instantaneous position of at least one of the motor vehicles and/or an instantaneous speed of at least one of the motor vehicles.

According to one specific embodiment of the present invention, one or more method steps are documented, in particular, are documented in a blockchain.

For instance, this yields the technical advantage that even after the method has been carried out or implemented, it is able to be analyzed later based on the documentation. In particular, the documenting in a blockchain has the technical advantage that the documentation is tamperproof and impossible to counterfeit.

A blockchain (also block chain, English for Blockkette) specifically is a continuously expandable list of data records, called "blocks", which are chained together with the aid of one or more cryptographic processes. In this context, each block includes, namely, a cryptographically protected hash (erratic value) of the previous block, particularly a time stamp and especially transaction data.

When the term "apparatus" is used, the term "RSU" should always be read too and vice versa.

The phrase "at least one" means "one or more".

In one specific embodiment of the present invention, the apparatus includes:

- a communication device which is equipped to receive driving-environment signals that represent an individual driving environment of the motor vehicles,
- a processor device which is equipped, based on the driving-environment signals, to ascertain infrastructure-assistance data for the infrastructure-supported assistance of the motor vehicles,
- the communication device being equipped to transmit infrastructure-assistance data signals which represent the ascertained infrastructure-assistance data,
- the processor device being equipped to prioritize the motor vehicles in order to assign a priority to each of the motor vehicles,
- the communication device being equipped to transmit the infrastructure-assistance data signals based on the priorities assigned to the motor vehicles, and/or
- the processor device being equipped to ascertain the infrastructure-assistance data for the infrastructure-supported assistance of the motor vehicles, based on the priorities assigned to the motor vehicles.

In one specific embodiment of the present invention, the apparatus includes an energy unit which is equipped to supply elements of the apparatus, particularly the communication device and/or the processor device, with electrical energy. For example, the energy unit includes an electric energy accumulator. The energy unit is equipped, for instance, to continue to operate in the event of a fault.

In one specific embodiment of the present invention, the communication device and the processor device are each equipped to continue to operate in case of a fault in such a way that the communication device continues to receive driving-environment signals, the processor device continues, based on the driving-environment signals, to ascertain infrastructure-assistance data for assisting the motor vehicle and the communication device continues to transmit the infrastructure-assistance data signals.

Thus, even in the case of a fault, it is possible for the communication device to continue to receive driving-environment signals, for the processor device to continue to ascertain infrastructure-assistance data for assisting the motor vehicle based on the driving-environment signals, and for the communication device to continue to transmit the infrastructure-assistance data signals.

According to one specific embodiment of the present invention, the apparatus is equipped to continue to operate in the event of a fault.

Exemplary embodiments of the present invention are represented in the figures and explained in greater detail in the following description.

DETAILED DESCRIPTION OF EXAMPLE EMBODIMENTS

Figure 1:
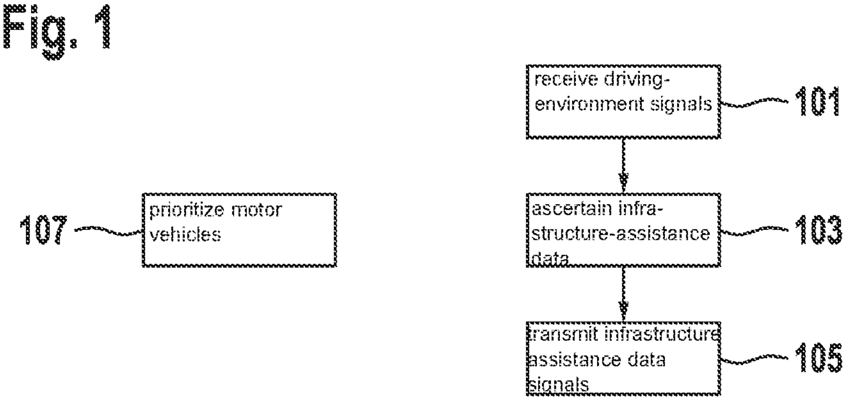
FIG. 1 shows a method for the infrastructure-supported assistance of multiple motor vehicles, according to an example embodiment of the present invention.

FIG. 1 shows a flowchart of a method for the infrastructure-supported assistance of multiple motor vehicles, including the following steps:

Receiving 101 of driving-environment signals which represent a driving environment of the motor vehicles, Ascertaining 103, based on the driving-environment signals, of infrastructure-assistance data for the infrastructure-supported assistance of the motor vehicles, Transmitting 105 of infrastructure-assistance data signals, which represent the ascertained infrastructure-assistance data, to the motor vehicles, Prioritizing 107 of the motor vehicles in order to assign a priority to each of the motor vehicles, at least one of the steps of ascertaining 103 the infrastructure-assistance data and of transmitting 105 the infrastructure-assistance data signals being carried out based on the priorities assigned to the motor vehicles.

The step of prioritizing 107 is identified symbolically by a rectangle. The rectangle was drawn separate from the three rectangles which symbolize the steps of receiving 101, ascertaining 103 and transmitting 105. This is intended to clarify that the step of prioritizing 107 may be carried out, e.g., between the step of receiving 101 and the step of ascertaining 103. For instance, prioritizing 107 may be carried out based on the driving-environment signals. Prioritizing 107 is carried out after the step of ascertaining 103 and before the step of transmitting 105, for example. In this case, transmitting 105 is carried out based on the priorities, whereas ascertaining 103 is carried out independently of the priorities, in so far as they were not yet determined at the relevant point in time.

For instance, prioritizing 107 is carried out based on the driving-environment signals.

It is provided, for instance, that of the multiple motor vehicles, several are selected based on the priorities, infrastructure-assistance data being ascertained only for the selected motor vehicles and/or the infrastructure-assistance data signals being transmitted only to the selected motor vehicles.

For instance, the priorities define a sequence, based on which the infrastructure-assistance data are ascertained and/or the infrastructure-assistance data signals are transmitted. For example, infrastructure-assistance data are ascertained for the individual motor vehicles according to the sequence. The infrastructure-assistance data signals are transmitted to the motor vehicles, e.g., according to the sequence.

Transmitting within the meaning of the description includes transmitting via a communication network, for example.

The formulation "ascertaining, based on the driving-environment signals, of infrastructure-assistance data for the infrastructure-supported assistance of the motor vehicles" is linguistically the formulation "ascertaining of infrastructure-assistance data for the infrastructure-supported assistance of the motor vehicles based on the driving-environment signals." Thus, these two formulations may be used synonymously.

Figure 2:
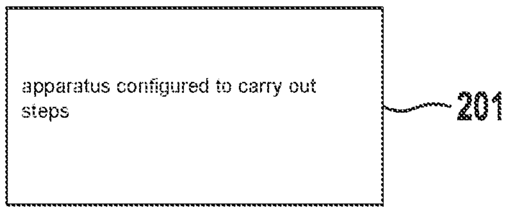
FIG. 2 shows an apparatus, according to an example embodiment of the present invention.

FIG. 2 shows an apparatus 201.

Apparatus 201 is equipped to carry out all steps of the method according to the first aspect.

In one specific embodiment not shown, apparatus 201 includes:

a communication device which is equipped to receive driving-environment signals that represent an individual driving environment of the motor vehicles, a processor device which is equipped, based on the driving-environment signals, to ascertain infrastructure-assistance data for the infrastructure-supported assistance of the motor vehicles, the communication device being equipped to transmit infrastructure-assistance data signals which represent the ascertained infrastructure-assistance data, the processor device being equipped to prioritize the motor vehicles in order to assign a priority to each of the motor vehicles, the communication device being equipped to transmit the infrastructure-assistance data signals based on the priorities assigned to the motor vehicles, and/or the processor device being equipped to ascertain the infrastructure-assistance data for the infrastructure-supported assistance of the motor vehicles based on the priorities assigned to the motor vehicles.

Figure 3:
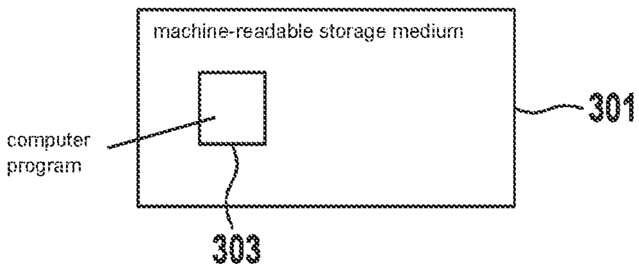
FIG. 3 shows a machine-readable storage medium according to an example embodiment of the present invention.

FIG. 3 shows a machine-readable storage medium 301.

Stored on machine-readable storage medium 301 is a computer program 303 that includes commands which, upon execution of computer program 303 by a computer, prompt it to carry out a method according to the first aspect.

Figure 4:
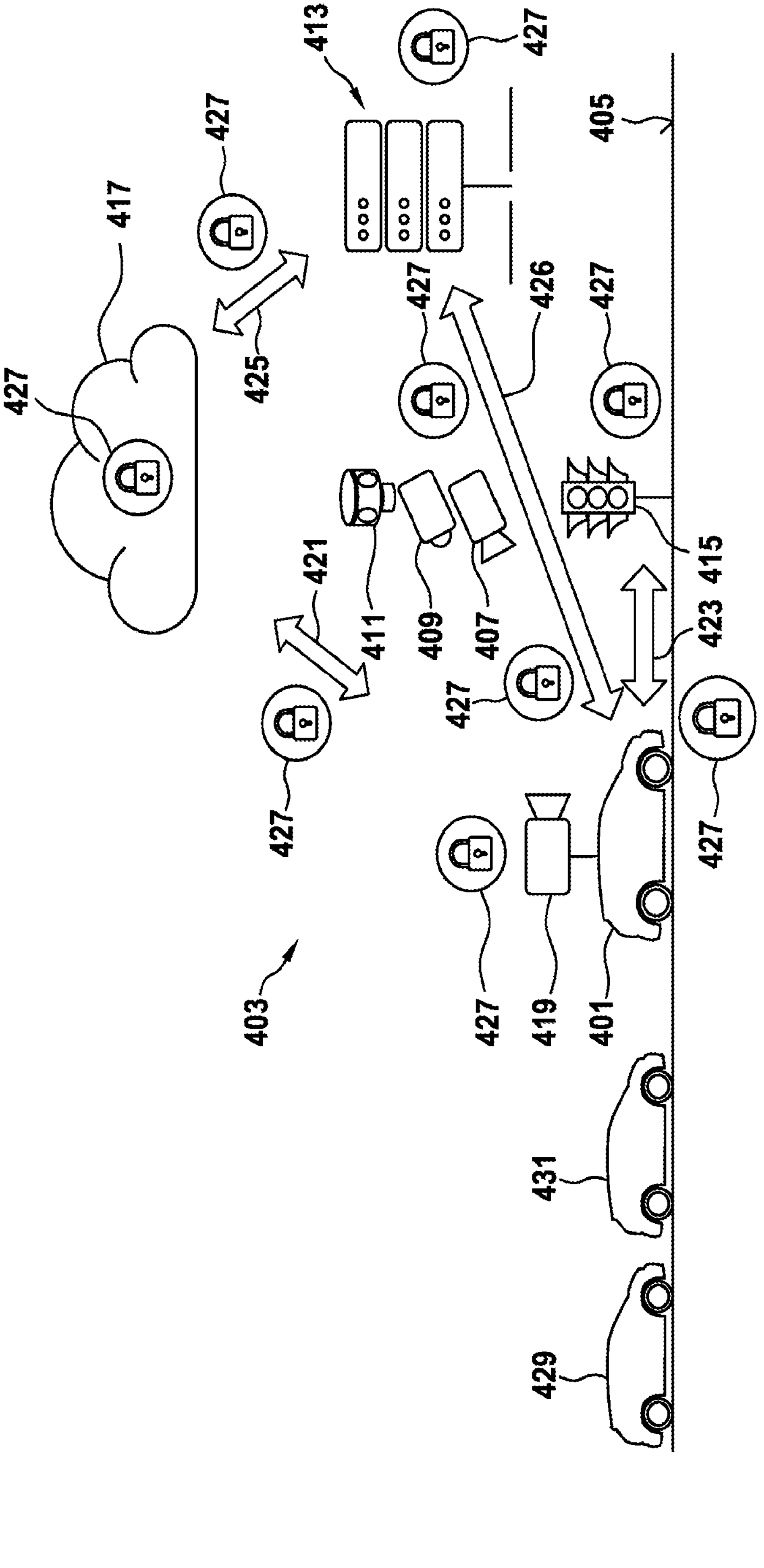
FIG. 4 shows a motor vehicle which is driving within an infrastructure, according to an example embodiment of the present invention.

FIG. 4 shows a first motor vehicle 401 which is driving within an infrastructure 403.

Infrastructure 403 includes a road 405 on which first motor vehicle 401 is driving.

Infrastructure 403 also includes a video sensor 407, a radar sensor 409 and a lidar sensor 411, these three infrastructure driving-environment sensors being distributed spatially within infrastructure 403 and sensing a driving environment of first motor vehicle 401. Driving-environment signals that correspond to the particular sensing and that represent the driving environment sensed in each case are provided to an RSU 413. RSU 413 is designed correspondent to one specific embodiment of the apparatus according to the second aspect, so that further explanations are omitted here.

RSU 413 receives the driving-environment signals, ascertains infrastructure-assistance data based on the driving-environment signals, and transmits infrastructure-assistance data signals representing the infrastructure-assistance data to first motor vehicle 401.

For example, RSU 413 may control a traffic light 415. For instance, the infrastructure-assistance data include control commands for controlling traffic light 415 in such a way that it indicates a red signal in order to signal to motor vehicle 401 that it should stop. This is advantageous, for example, if, based on an analysis of the driving environment, RSU 413 has determined that there is a critical situation in the direction of travel of first motor vehicle 401.

In addition, optionally a cloud database 417 is provided, which is able to make historic traffic data available to RSU 413, for instance, based on which, RSU 413 ascertains the infrastructure-assistance data.

First motor vehicle 401 includes a video sensor 419 on the roof, which senses a driving environment of first motor vehicle 401 and outputs driving-environment signals corresponding to the sensing. These driving-environment signals are transmitted with the aid of first motor vehicle 401 to RSU 413, for instance, so that it ascertains the infrastructure-assistance data based on these additional driving-environment signals.

In addition, four double arrows are drawn in in FIG. 4: A first double arrow 421, a second double arrow 423, a third double arrow 425 and a fourth double arrow 426. They each symbolize a communication link between individual elements shown in FIG. 4.

Thus, first double arrow 421 symbolizes a communication link between first motor vehicle 401 and cloud database 417. For example, first motor vehicle 401 may upload the driving-environment signals of video camera 419 into cloud database 417, where they are further processed and, e.g., are fused with driving-environment signals of further driving-environment sensors of further motor vehicles (for instance, of a second motor vehicle 429 and a third motor vehicle 431, see also explanations below), in order to determine a fused driving-environment model which is transmitted to RSU 413.

Second double arrow 423 symbolizes a communication link between first motor vehicle 401 and traffic light 415. Thus, for example, traffic light 415 may transmit a remaining green time to first motor vehicle 401, so that based on it, the first motor vehicle is guided in at least semi-automated fashion by adjusting a speed to the remaining green time, for example.

Third double arrow 425 symbolizes a communication link between RSU 413 and cloud database 417.

Fourth double arrow 426 symbolizes a communication link between first motor vehicle 401 and RSU 413.

Lock symbols having reference numeral 427 are also drawn in in FIG. 4, in order to clarify that optionally the individual communication links and/or the transmitted information or data are encrypted, for example. In other words, optionally an encrypted communication link is thus established between the individual communication participants or partners. That is, optionally the individual items of information or data are therefore stored in encrypted fashion.

Second motor vehicle 429 and third motor vehicle 431 are likewise driving on road 405 and in each case include one or more driving-environment sensors, not shown. The remarks made in connection with first motor vehicle 401 hold true analogously for second motor vehicle 429 and third motor vehicle 431. Thus, analogous to the first motor vehicle, second motor vehicle 429 and third motor vehicle 431 also communicate with the elements shown in FIG. 4. For reasons of clarity, corresponding additional double arrows were omitted.

Therefore, RSU 413 supports the three motor vehicles 401, 429, 431, thus, multiple motor vehicles, by way of infrastructure-assistance data. According to the concept described here, RSU 413 prioritizes the three motor vehicles 401, 429, 431 and assigns a priority to the three motor vehicles 401, 429, 431 depending on the prioritization.

In the normal case, thus, for example, when no fault is detected during the support, all three motor vehicles 401, 429, 431 are supported equally. In the case of a fault, thus, for example, if one of the three motor vehicles 401, 429, 431 reports a fault to RSU 413, and/or if RSU 413 detects a fault, e.g., an internal fault, e.g., a hardware fault, e.g., a hardware failure, then the three motor vehicles 401, 429, 431 are supported according to their priority.

For example, the motor vehicle prioritized with a (possible) risk of accident is supported. In particular, this is the case when a functionality of RSU 413 itself is curtailed.

For example, the support, thus, the assistance, of motor vehicles 401, 429, 431 is prioritized based on the results of the driving-environment analysis. This means, for example, that if a motor vehicle will perhaps/probably have an accident, then this motor vehicle is classified with a high priority.

For instance, this prioritization is calculated or carried out at regular intervals and/or, e.g., on the basis of further influences (e.g., a motor vehicle reports a problem).

In addition, in one specific embodiment, the criticalities and/or the prioritizations are classified. That is, preferably categorizations of the probability and/or of the severity of the effects are determined.

For example, the following categorizations or classes are provided: On the assumption that motor vehicles 401, 429, 431 receive no infrastructure assistance, an accident for the respective motor vehicle is: not likely (level 0), possible (level 1), probable (level 2), very probable (level 3).

The following categorizations or classes are provided, for example: On the assumption that motor vehicles 401, 429, 431 receive no infrastructure assistance, the effects of an accident (presumable) are: Very slight (vehicle damage) (level A), slight (minor injuries) (level B), medium (serious injuries) (level C), severe (fatality) (level D), very severe (many fatalities) (level E).

The categorizations above are used only for an exemplary description of the method. For example, classes/categorizations are presumably specified/defined by Highway Acts, standards, laws, etc.

Preferably, the/all motor vehicles are informed about their classification/categorization.

For instance—depending on criticality and prioritizations—the infrastructure-assistance data are transmitted in prioritized fashion.

The exemplary implementations above concerning the categorizations and classes are explained in connection with the exemplary embodiment according to FIG. 4. It should be noted that these implementations also stand apart from the concrete exemplary embodiment.

In the event of a (possible) curtailment, RSU 413 sends to motor vehicles 401, 429, 431 the information that the infrastructure assistance (support) is curtailed. For example, RSU 413 communicates that only some of motor vehicles 401, 429, 431 are supported (preferably with indication as to which motor vehicles). For instance, RSU 413 communicates that the infrastructure assistance is available only for a certain time, e.g., x seconds.

In this context, the support in the "further work" is carried out, for example, on the basis of the prioritizations (which in turn were determined based on the criticality, for example) and/or, for instance, on the basis of the classifications/categorizations.

That is, in the event of a problem of RSU 413 (e.g., limited power, only y seconds operation, . . . ) always those motor vehicles are still supported and/or are supported first of all and/or with a high priority, which with a certain minimum probability will have an accident, that is, the motor vehicles which are in one class/categorization.

Preferably, the/all vehicles are informed about their support status.

What is claimed is:

1. A method for infrastructure-supported assistance of multiple motor vehicles, comprising the following steps:

receiving driving-environment signals which represent a driving environment of the motor vehicles;

ascertaining, based on the driving-environment signals, infrastructure-assistance data for the infrastructure-supported assistance of the motor vehicles;

transmitting infrastructure-assistance data signals, which represent the ascertained infrastructure-assistance data, to the motor vehicles; and prioritizing the motor vehicles to assign a priority to each of the motor vehicles;

wherein at least one of the ascertaining of the infrastructure-assistance data step and the transmitting of the infrastructure-assistance data signals step is carried out based on the priorities assigned to the motor vehicles, wherein the infrastructure-assistance data is ascertained based on a predicted future traffic situation involving the motor vehicles, the prediction based on the driving-environment signals, wherein a specific infrastructure-assistance time is determined for each of the motor vehicles based on an automation level according to which the motor vehicle is driving at the moment, and wherein at least one of the ascertaining of the infrastructure-assistance data and the transmitting of the infrastructure-assistance data signals is carried out based on the infrastructure-assistance time determined for each motor vehicle, wherein the infrastructure-supported assistance includes providing at least one of: remote-control commands for guiding a motor vehicle, traffic-signal control data, or predicted future traffic data, and wherein the assigned priority indicates the order in which the infrastructure-assistance data are ascertained and/or transmitted to the motor vehicles.

2. The method as recited in claim 1, wherein status signals are received which represent an individual status of the motor vehicles, the motor vehicles being prioritized based on the individual status.

3. The method as recited in claim 2, wherein the status indicates one or more of the following status data: automation level according to which the motor vehicle is driving at the moment, probably accident severity in the event of an absence of infrastructure-supported assistance, fault in a system of the motor vehicle, severity of a fault in a system of the motor vehicle, a time indication as to when a driver of the motor vehicle will assume complete responsibility for guidance of the motor vehicle when the motor vehicle is guided in at least semi-automated fashion.

4. The method as recited in claim 1, wherein an individual criticality is determined for each respective motor vehicle of the motor vehicles, the individual criticality indicating an individual probability for the respective motor vehicle that the respective motor vehicle will have an accident, the motor vehicles (being prioritized based on the individual criticalities determined.

5. The method as recited in claim 4, wherein the motor vehicles are classified into accident-probability classes based on the individual accident probability, the motor vehicles being prioritized based on their classified accident-probability class.

6. The method as recited in claim 4, wherein an individual accident severity is determined for each of the motor vehicles, the motor vehicles being classified into accident-severity classes based on the individual accident severity, the motor vehicles being prioritized based on their classified accident-severity class.

7. The method as recited in claim 4, wherein the method steps are carried out based on an assumption that no infrastructure assistance is available for the motor vehicles by way of the infrastructure-assistance data.

8. The method as recited in claim 1, wherein the motor vehicles are informed about their priority.

9. The method as recited in claim 1, wherein upon detection of a fault which makes it necessary to terminate implementation of the method, based on the priorities, a subset of the motor vehicles is determined which should still receive infrastructure assistance by way of the infrastructure data, at least one of the ascertaining of the infrastructure-assistance data step and the transmitting of the infrastructure-assistance data signals step being carried out only for the subset of the motor vehicles determined.

10. An apparatus for infrastructure-supported assistance of multiple motor vehicles, comprising:

receive driving-environment signals which represent a driving environment of the motor vehicles;

ascertain, based on the driving-environment signals, infrastructure-assistance data for the infrastructure-supported assistance of the motor vehicles;

transmit infrastructure-assistance data signals, which represent the ascertained infrastructure-assistance data, to the motor vehicles; and prioritize the motor vehicles to assign a priority to each of the motor vehicles;

wherein at least one of the ascertaining of the infrastructure-assistance data and the transmitting of the infrastructure-assistance data signals is carried out based on the priorities assigned to the motor vehicles, wherein the infrastructure-assistance data is ascertained based on a predicted future traffic situation involving the motor vehicles, the prediction based on the driving-environment signals, wherein a specific infrastructure-assistance time is determined for each of the motor vehicles based on an automation level according to which the motor vehicle is driving at the moment, and wherein at least one of the ascertaining of the infrastructure-assistance data and the transmitting of the infrastructure-assistance data signals is carried out based on the infrastructure-assistance time determined for each motor vehicle, wherein the infrastructure-supported assistance includes providing at least one of: remote-control commands for guiding a motor vehicle, traffic-signal control data, or predicted future traffic data, and wherein the assigned priority indicates the order in which the infrastructure-assistance data are ascertained and/or transmitted to the motor vehicles.

11. A non-transitory machine-readable storage medium on which is stored a computer program for infrastructure-supported assistance of multiple motor vehicles, the computer program, when executed by a computer, causing the computer to perform the following steps:

receiving driving-environment signals which represent a driving environment of the motor vehicles;

ascertaining, based on the driving-environment signals, infrastructure-assistance data for the infrastructure-supported assistance of the motor vehicles;

transmitting infrastructure-assistance data signals, which represent the ascertained infrastructure-assistance data, to the motor vehicles; and prioritizing the motor vehicles to assign a priority to each of the motor vehicles;

wherein at least one of the ascertaining of the infrastructure-assistance data step and the transmitting of the infrastructure-assistance data signals step is carried out based on the priorities assigned to the motor vehicles, wherein the infrastructure-assistance data is ascertained based on a predicted future traffic situation involving the motor vehicles, the prediction based on the driving-environment signals, wherein a specific infrastructure-assistance time is determined for each of the motor vehicles based on an automation level according to which the motor vehicle is driving at the moment, and wherein at least one of the ascertaining of the infrastructure-assistance data and the transmitting of the infrastructure-assistance data signals is carried out based on the infrastructure-assistance time determined for each motor vehicle, wherein the infrastructure-supported assistance includes providing at least one of: remote-control commands for guiding a motor vehicle, traffic-signal control data, or predicted future traffic data, and wherein the assigned priority indicates the order in which the infrastructure-assistance data are ascertained and/or transmitted to the motor vehicles.

* * * * *